United States Patent [19]

Studer

[11] 4,401,178

[45] Aug. 30, 1983

[54] WHEELCHAIR CARRIER

[75] Inventor: Beat W. Studer, Zug, Switzerland

[73] Assignee: Stair Aid Corporation of North America, Concord, Canada

[21] Appl. No.: 196,316

[22] Filed: Oct. 14, 1980

[51] Int. Cl.[3] .......... B62B 5/02

[52] U.S. Cl. .......... 180/8 A; 180/9.22; 180/DIG. 3; 280/5.22; 280/242 WC; 280/289 WC; 280/DIG. 10; 297/DIG. 4

[58] Field of Search .......... 280/DIG. 10, 5.22; 180/8.2, 9.2 R, DIG. 3; 188/171

[56] References Cited

U.S. PATENT DOCUMENTS

| | | | |
|---|---|---|---|
| 1,884,863 | 10/1932 | Remde | 188/171 |
| 2,025,098 | 12/1935 | Dudick | 128/171 |
| 2,262,352 | 11/1941 | Arnold et al. | 188/171 |
| 2,481,402 | 7/1949 | Dederick | 188/171 |
| 3,111,331 | 11/1963 | Locke | 280/5.22 |
| 3,133,742 | 5/1964 | Richison et al. | 280/DIG. 10 |
| 3,146,841 | 9/1964 | Locke | 280/5.22 |
| 3,191,953 | 6/1965 | Aysta | 280/5.22 |
| 3,195,910 | 7/1965 | Steiner | 280/5.22 |
| 3,276,531 | 10/1966 | Hale et al. | 280/5.22 X |
| 3,288,234 | 11/1966 | Feliz | 180/9.3 X |
| 4,156,478 | 5/1979 | Kroeger | 188/171 |

FOREIGN PATENT DOCUMENTS 1428315 3/1976 United Kingdom .

1546130 5/1979 United Kingdom .

*Primary Examiner*—David M. Mitchell
*Assistant Examiner*—Mitchell J. Hill
*Attorney, Agent, or Firm*—Ivor M. Hughes

[57] ABSTRACT

A stair climbing wheelchair carrier comprising a handle assembly and base, the handle assembly for securing the wheelchair to the carrier, means for securing the handle assembly to the base, the base comprising a pair of spaced endless tracks having climbing lugs on the outside surface thereof, each of the endless tracks entrained around a pair of rollers and passing under the outer surface of a runner, one of the rollers situate proximate one end of the runner, the other proximate the other end, the runner being bent intermediate its ends to form a first portion extending away from one of the rollers and a second portion extending away from the first portion towards the second roller at an angle of between about 125° and about 145° to the first portion, the length of track extending under the second portion and around the roller proximate the second portion being such as to extend over the usual bottom step of a staircase when the carrier is positioned proximate the bottom of the staircase, and the disposition of the first portion of the runner being such as to overlie the surface on which the wheelchair carrier is used whereby the track engaging the surface or stair is fully supported.

23 Claims, 11 Drawing Figures

FIG. 5.
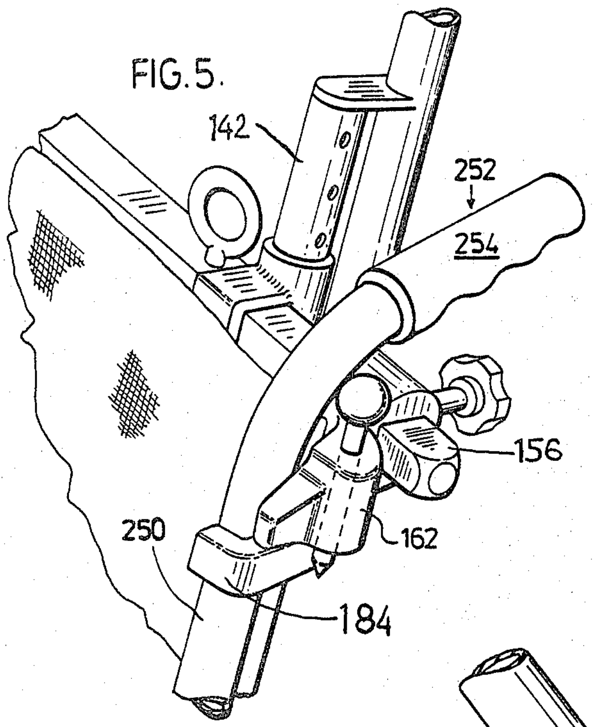
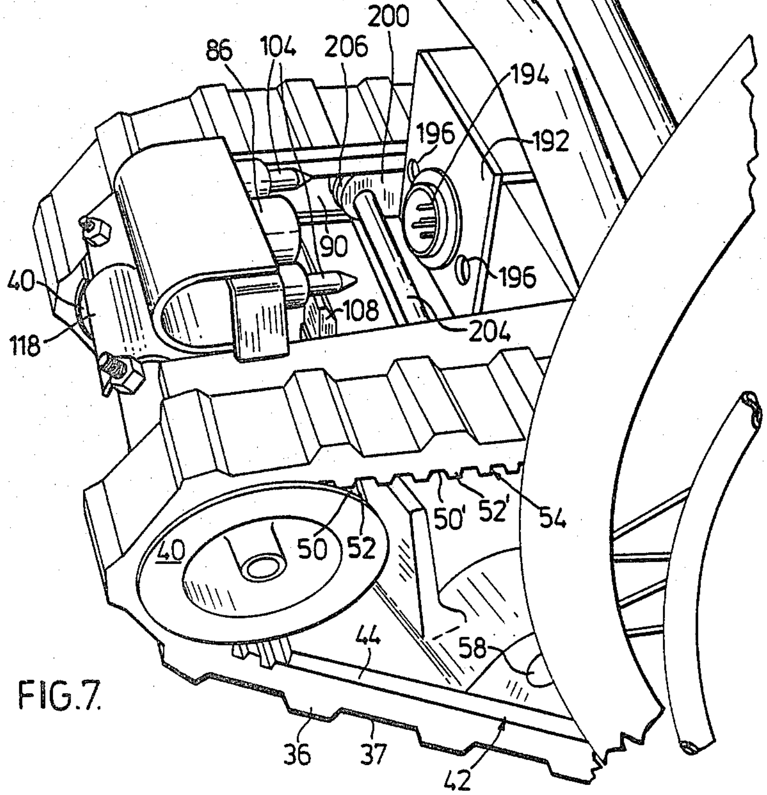
FIG. 7.

WHEELCHAIR CARRIER

FIELD OF INVENTION

This invention relates to tracked stair climbers for the transportation of invalids in their wheelchairs, up and down stairways.

BACKGROUND OF THE INVENTION

Various approaches have been taken to the transportation of invalids up and down stairways. Some of these are set out in U.K. Pat. No. 1,546,130 in the description of the prior art proposals. While fixed on site lifts have been proposed, few of them have actually been installed. It has therefore been necessary, for the invalid to carry his/her own motorized wheelchair carrier in the trunk of the automobile for such assembly at the building site.

One such carrier is shown in U.K. Pat. No. 1,546,130 and comprises a base assembly and handle assembly connectable to the base assembly. The base assembly comprises an endless track motion system comprising at least one belt guided around a starlike arrangement of rolls mounted on respective arms, carried by a free revolving hub. The inventor claims not only superior performance at the beginning of the climb, during the climb and termination of the climb, but also during any descent. However, because of the complicated starlike track supporting arrangement, there is a lack of support of tread in both climbing areas (See for example, FIG. 4 of that patent), the device is not satisfactory for carrying out a safe stair climbing operation, and has not been widely accepted by the public.

Another carrier employs one large roller in place of the starlike arrangement about which the endless rubber track is entrained. However, this device also lacks the back-up support for the track and is not effective, particularly when the first step is higher than the radius of the roller plus the track passing around the roller. Additionally, when the carrier engages the bottom stair, the invalid passenger is jarred.

Furthermore, each of the devices must be disassembled for transportation and easily reassembled for safe operation in all instances. However, in this regard, the prior art proposals have not been entirely satisfactory and the passenger safety could not be insured. For example, in emergencies, the locking assembly must guarantee the absolute security of the invalid.

It is therefore an object of this invention to provide wheelchair carriers for climbing stairways, which in various forms, are easily assembled and disassembled, secure during all aspects of their operation, and which provide a smooth ride for the passenger and which brake quickly and efficiently in emergencies.

Further and other objects of the invention will be realized by those skilled in the art from the following summary of the invention and detailed description of a preferred embodiment thereof.

SUMMARY OF THE INVENTION

According to one aspect of the invention, an improved stair climbing wheelchair carrier is provided, the carrier comprising a top or handle assembly and base, the top or handle assembly for supporting a wheelchair and securing the wheelchair thereto and connected to the base, the base comprising a pair of endless tracks having climbing lugs on the outside surface thereof, each of the endless tracks entrained around a pair of rollers and passing under the outer surface of a runner, one of the rollers situate proximate one end of the runner and the other proximate the other end, the runner being bent intermediate its ends to form a first portion extending away from one of the rollers and a second portion extending away from the first portion towards the second roller at an angle of between about 125° and about 145° and preferably, about an angle of 135° to the first portion, the length of track extending under the second portion and around the roller proximate the end of the second portion remote the first portion being such as to extend over the bottom step of a staircase when positioned proximate the step and the disposition of the first portion of the runner being such as to overlie the surface on which the carrier is used whereby the track engaging the surface or stair is fully supported. Preferably, drive means drives at least one roller of each pair of rollers and said at least one roller for each track is provided with driving lugs and recesses on its outer surface and the tracks have corresponding complimentary recesses and lugs on their inner surfaces for engaging the lugs and recesses of the roller. Preferably the roller proximate the end of the second portion of the runner is positioned considerably above the roller proximate the end of the first portion of the runner to provide an upper sloped track portion.

The handle assembly may be angled to about 125° to the first portion of the runner.

According to another aspect of the invention, electrical drive means are provided in the base for driving the endless tracks and thus the carrier, said drive means including a battery for operating the drive means, an electrical motor driven by the battery and means to preclude movement of the track when the motor is electrically unactivated for example, brake pads applied to preclude rotation of the drive shaft extending from the motor.

In another embodiment, the drive shaft extending from the electric motor, is surrounded by an electromagnet and spring, both fixed in position, a non-rotatable iron metal plate secured to the spring remote the motor, the iron plate to be normally spaced from the electromagnet under the action of the spring, a second plate secured to the drive shaft to rotate therewith, brake pads between the first and second plates and engaging both plates when the iron plate is spaced from the electromagnet, thereby precluding rotation of the drive shaft. When the motor is electrically activated, the electromagnet is activated, pulling the first plate towards it, disengaging the brake pad from both plates, permitting the second plate and thus the drive shaft to rotate. If therefore the carrier is to be stopped immediately (as in an emergency), the electrical current is cut thus braking the drive shaft.

According to another aspect of the invention, the base may include electrical circuit connecting means for connecting the drive means to controls for controlling the operation of the drive means, means on the base to connect the handle assembly to the base, and the handle assembly may comprise complimentary means for connecting to the means on the base for connecting the handle assembly to the base, controls for controlling the operation of the drive means, and electrical circuit connecting means connected to the controls for connecting to the electrical circuit connecting means on the base for connecting the drive means to the controls.

In one embodiment, the base carries a pair of inwardly opening channels terminating at one end proximate the roller proximate the end of the first portion of the runner, the channels having an entry opening through the top thereof spaced from the end of the channels, which terminates proximate the roller proximate the end of the first portion of the runner, the channels extending on the base at substantially the same angle to the ground as the upper part of the track extending between the rollers and the electrical circuit connecting means on the base comprises a male or female plug situate proximate the end of the channels remote the ends of the channels nearest the openings, electrically connected to the battery and drive means, and the handle assembly comprises a roller assembly proximate the bottom thereof, the roller assembly comprising laterally spaced pairs of longitudinally spaced rollers for sliding in the channels, after having been fed into the channels through the openings, each roller being of a diameter smaller than the openings in the top of the channels, the lateral spacing between the pair of rollers being substantially equal to the spacing between the channels, and the electrical connecting means electrically connected to the controls comprises complimentary female or male plugs for securing with the male or female plugs on the base when the rollers are positioned in the channel and moved in the channels to connect the plugs. Preferably each opening is spaced from the channel end by a distance substantially equal to the longitudinal spacing of the rollers of each pair of rollers moving in the same channel.

When the electrical connecting means are interconnected, the handle assembly must be locked safely into position. To this end, safety locking means are provided for locking the handle assembly to the base. In one embodiment, the locking means comprises a latch mechanism comprising normally upwardly urged latch teeth extending upwardly from the base and retractable into the base upon compressing the spring normally urging the teeth upwardly, and a pair of laterally extending members secured proximate the bottom of the roller assembly, to the roller assembly, (for example, a connector or axle connecting the laterally spaced rollers) each of the members being engagable by the latch teeth when the latch teeth normally extend upwardly and not being so engagable by the teeth when the teeth are retracted and means for retracting the latch teeth, the latch teeth being sloped on the side of the teeth remote the male or female plug in the base in a direction from their top away from the plugs in the base but not on the other side. In this way, as the handle assembly is moved to make the electrical connection by sliding the rollers in the channels, the laterally extending members successively engage the teeth, slide up the slope of the teeth forcing the teeth downwardly against the action of the spring, and ride over them to permit the connection. Should the means for retracting the latch teeth be inadvertently engaged and the plugs disconnected then the handle assembly at least has a "second line of connection" to the base to ensure the safety of the passenger. The second laterally extending member may be so positioned that although it acts to stop the handle assembly from coming away from the base, the electrical connection is lost between the plugs.

For additional safety, the control means may comprise a switch spring urged, to an off position and being pivotable or movable against the action of the spring, in one direction to activate the motor and cause the tracks to move in one direction and in the other direction to activate the motor and cause the tracks to move in the reverse direction. If the operator should let go of the switch, because the switch is normally urged to the off position, the carrier would be deactivated, the brake aplied stopping the carrier in its tracks.

According to another aspect of the invention, the carrier includes securing means for securing the wheelchair to the carrier, the securing means comprising wheel supports on which the wheels of the wheelchair may rest, vertically adjustable arms and support means carried by the handle assembly for assembly. In one embodiment, the handle assembly includes two sleeves supporting two spaced vertically adjustable support members, the members supporting a laterally extending sleeve opening laterally at either end and having laterally telescoping members extending therefrom, the laterally telescoping members having adjustable support means slidable on the telescoping members for locking any size wheelchair to the carrier. In one embodiment, the support means comprises surfaces on which the handles (projecting from the wheelchair at the top and with which the operator grasps and manipulates the wheelchair) rest, and a lockable arm pivotable in the horizontal direction for grasping vertical frame members of the wheelchair and locking them to the handle assembly.

The invention will now be illustrated with reference to the following drawings of the preferred embodiments.

BRIEF DESCRIPTION OF THE DRAWINGS

FIG. 5 is a close-up view of part of the carrier as used in FIG. 1 to secure a wheelchair.

FIG. 7 (found with FIG. 5) is a close-up view of part of the carrier in a partially disassembled state.

DETAILED DESCRIPTION OF PREFERRED EMBODIMENTS

Figure 1:
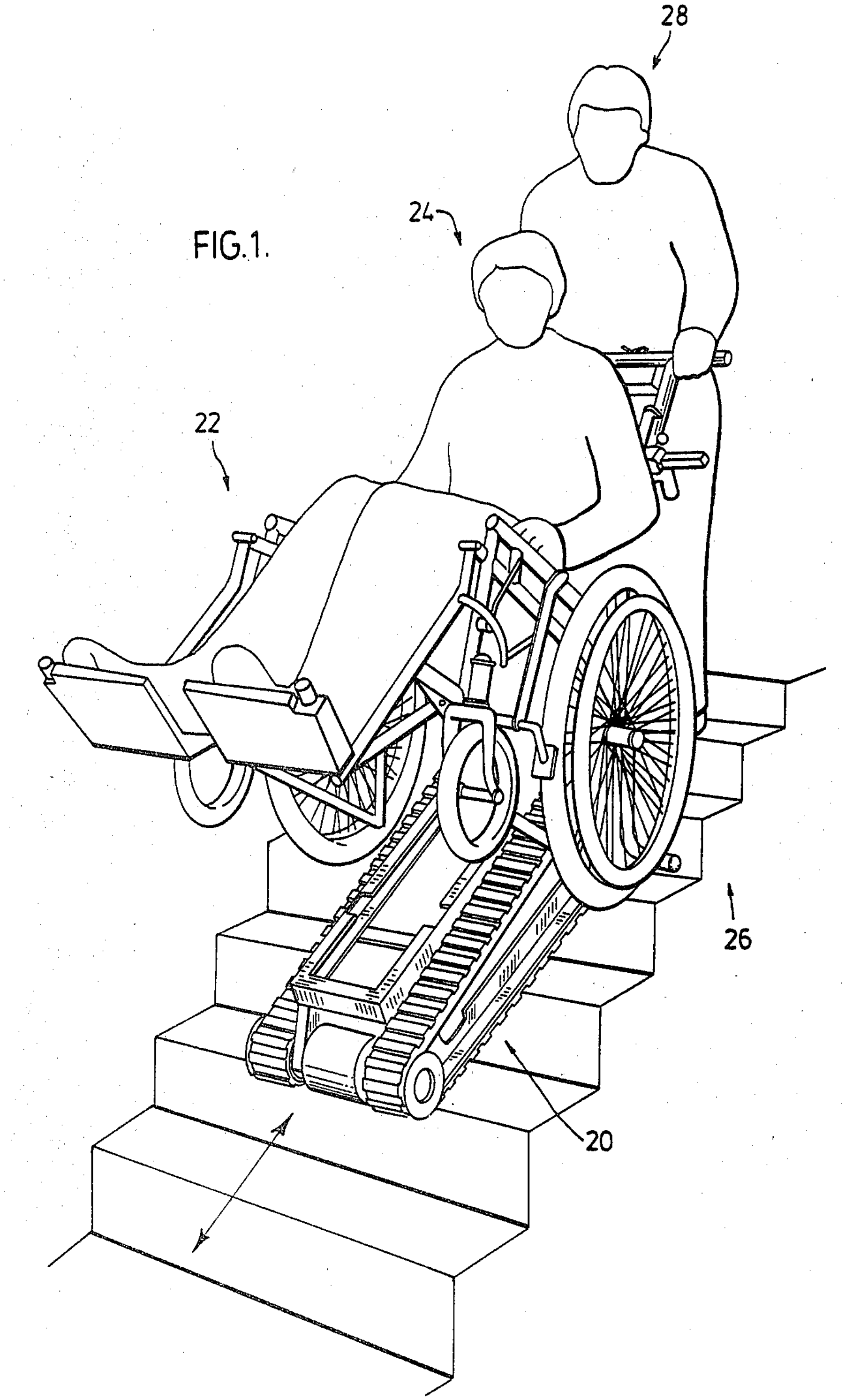
FIG. 1 is a perspective view of a stair climbing wheelchair carrier being employed to climb a sample flight of stairs according to the preferred embodiment of the invention.

With reference to FIG. 1, there is shown stair climbing wheelchair carrier 20 shown carrying invalid 24 seated in wheelchair 22 up or down staircase 26, controlled by operator 28.

Figure 2:
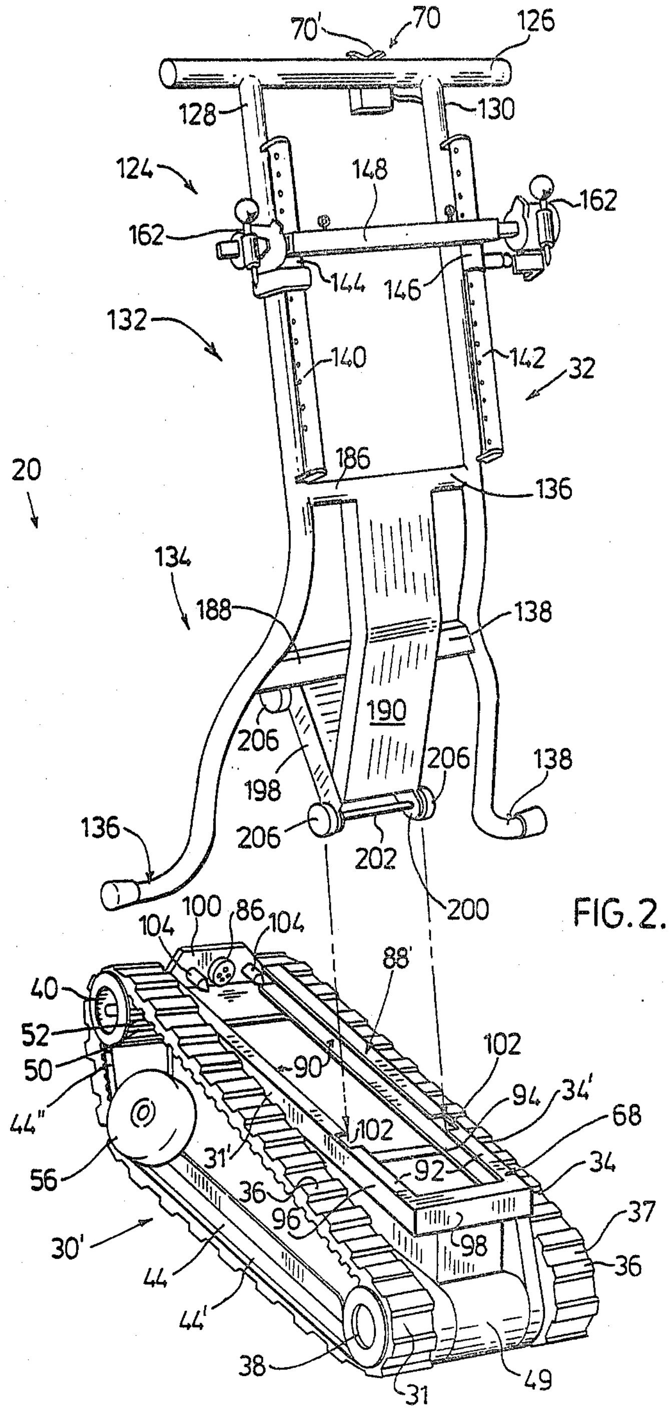
FIG. 2 is a perspective view of the carrier employed in FIG. 1 partially disassembled.

With reference to FIG. 2, carrier 20 comprises base 30 and handle assembly 32 removably securable to base 30. Base 30 comprises a pair of spaced endless rubber tracks 31 and 34 having climbing lugs 36 on the outer surface 37, each of tracks 31 and 34 being entrained about a pair of rollers 38 and 40 and passing under the outer surface 42 of metal runner 44 (see also FIGS. 7, 9, 10 and 11) positioned on either side of base 30. Each of rollers 38 is journaled for rotation on drive shaft 46 (see FIG. 8) rotated by drive system 48 through reduction gear box 49 and comprises a series of drive lugs 50 and recesses 52 (see FIGS. 2, 7 and 8) for engaging complimentary recesses $50^1$ and lugs $52^1$ on the inner surface 54 of endless tracks 31 and 34. Rollers 40 are likewise provided with lugs 50 and recesses 52 for engagement with recesses $50^1$ and lugs $52^1$. Each runner 44 is bent intermediate its ends into portions $44^1$ (720 mm long) and $44^{11}$ (210 mm long) (See FIGS. 2 and 9) angled 135° to one another. Rollers 40 are journaled for rotation on axles (not shown) secured to the upper portions of portions $44^{11}$.

A pair of rubber tired wheels 56 are carried on either side of the chassis of base 30 (See FIGS. 2 and 9) for temporary insertion into apertures 58 (see FIGS. 7 and 9) for moving the carrier 20 by hand when not in use.

With reference to FIG. 2 because of the positioning of the rollers 38 and 40 with respect to runner 44, that part of the tracks $31^1$ and $34^1$ extending over rollers 38 and 40 is inclined at an angle of about 15° to the horizontal.

Figure 8:
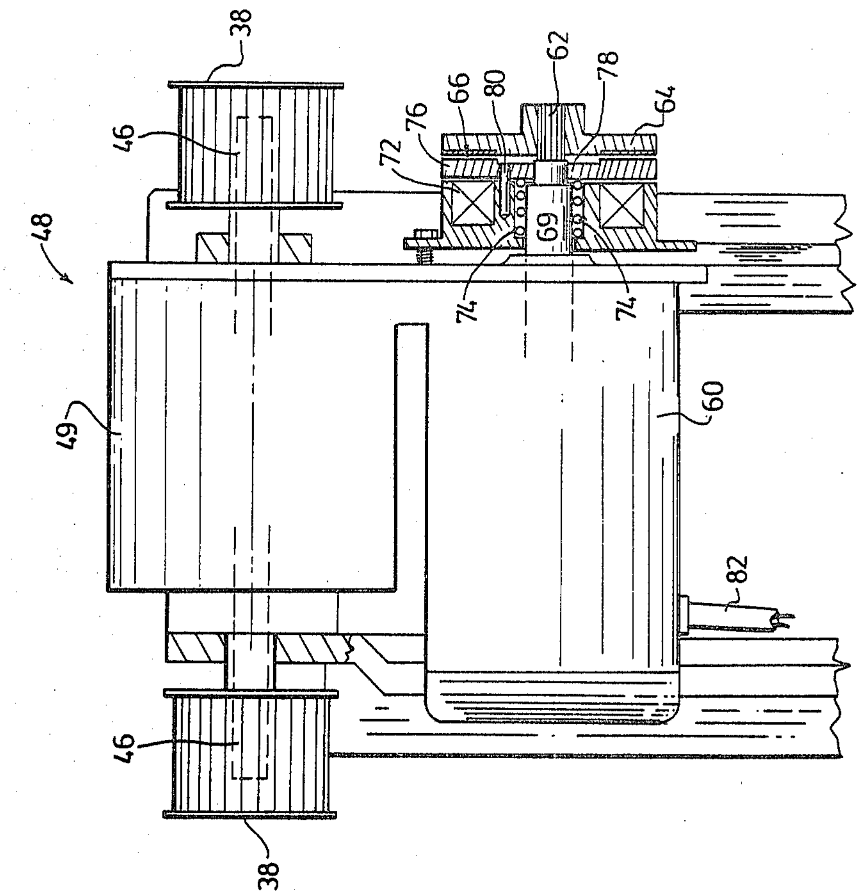
FIG. 8 is a schematic of part of the drive system of the carrier illustrating the component parts of braking system of the carrier.

Drive system 48 is secured to runners 44 proximate rollers 38 and comprises electric motor 60 (Mitsubishi DC Motor Model PM-20155)—see FIG. 8—having drive shaft 62 extending from sleeve 69 of motor 60, shaft 62 being secured to outer covering plate 64 carrying brake pads 66 which rotate with the rotation of shaft 62. Electric motor 60 is powered by a dry removable rechargeable 12 volt battery 68 (See FIG. 3) carried by base 30 and controlled by control switch 70 (See FIG. 2) as will be discusssed later.

Disposed intermediate plate 64 surrounding sleeve 69 secured to motor 60 is annular electromagnet 72 surrounding shaft 62, activated when motor 60 is activated and annular compression spring 74 surrounding sleeve 69 and secured thereto intermediate sleeve 69 and electromagnet 72. Iron plate 76 having centrally disposed aperture 78 therethrough for the passage of drive shaft 62 is secured between cover plate 64 and electromagnet 72 and is secured to spring 74 for movement towards, and away from, electromagnet 72. Alignment pin 80 secured to plate 76, extends between electromagnet 72 and spring 74 for maintaining plate 76 in position.

Because the functioning of electromagnet 72 is controlled by the feeding of electricity to motor 60, whenever motor 60 is inoperative, compression spring 74 pushes plate 76 into contact with cover plate 64 and thus brake pads 66, precluding the rotation of plate 64 and thus drive shaft 62.

When electromagnet 72 is activated when motor 60 is energized, it draws plate 66 to it, freeing plate 64 for rotation with drive shaft 62 for rotation of rollers 38 thus driving base 30. As plate 66 is drawn to electromagnet 72, spring 74 is compressed until the motor and thus the electromagnet are deactivated, restoring the spring and thus plate 76 into contact with brake pads 66.

Therefore should the motor for some reason be deactivated during the ascending or descending operation, plate 76 engaging plate 64 and brake pads 64 precludes rotation of shaft 62 in turn precluding rotation of rollers 38, which in turn stops any movement of base 30.

Drive shaft 62 is coupled to reduction gear box 49 carried by runners 44, gear box 49 in turn coupled to rollers 38 through drive shaft 46 for driving rollers 38 whenever motor 60 is activated for driving tracks 31 and 34 for driving carrier 20.

Figure 3:
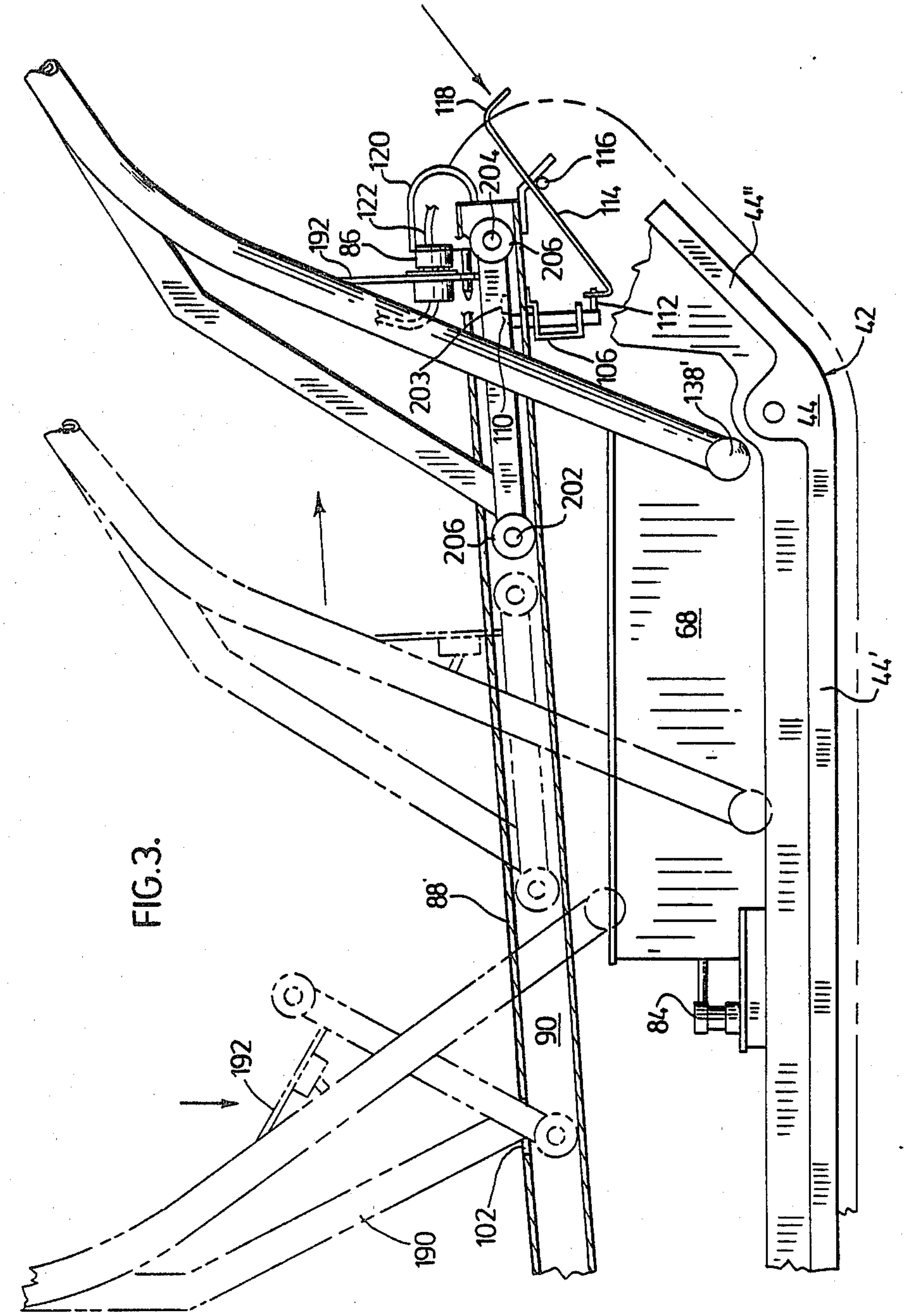
FIG. 3 is a schematic side view illustrating the assembly of the components shown in FIG. 2.

Motor 60 through wire 82 (See FIG. 8) and battery 68 (through connection 84—see FIG. 3) are coupled to control 70 through female plug 86 (See FIG. 7) (electrically connected to motor 60 and battery 68—not shown) supported in box frame structure 88 (See FIGS. 2,3, and 7). Box frame structure 88 comprises a pair of inwardly opening channels 90 formed by upper walls 92, lower walls 94 and side walls 96 spaced by cross frame members 98 and 100. Each of upper walls 92 has an opening 102 spaced a predetermined distance from cross-member 98 and is slightly larger than the height of channel 90. Cross-member 100 as well as supporting female plug 86, also supports tapered alignment pins 104 projecting in a direction parallel to channels 90.

Latch housing 106 is secured under walls 94 and supports a pair of latches 108 and 110 normally urged to extend upwardly into the space between the laterally spaced channels 90. Each of latches 108 and 110 is sloped from its top to a thicker portion intermediate its length in a direction away from female plug 86. Projections 112 extend horizontally away from the bottom of the latches and are coupled to Z-shaped member 114 supported on cross-member 116. By depressing panel 118 (See FIG. 3), pins 112 are lowered withdrawing latches 108 and 110 from their extended positions into housing 106.

Cover 120 covers wiring 122 leading from female plug 86 to the battery connection 84 and motor wire 82.

Handle assembly 32 comprises a frame generally indicated at 124. Frame 124 comprising handle 126, vertical members 128 and 130 extending from handle 126 intermediate its ends, members 128 and 130 being spaced from one another in the area 132 of its length by a distance about equal to the width of the base, generally flaring or diverging for a predetermined distance below area 132 generally indicated as 134 and terminating in laterally extending ends 136 and 138 directed away from one another and being spaced by a distance substantially the width of the main wheels of a wheelchair to support the wheels of the wheelchair.

In area 132 members 128 and 130 secure a pair of vertically extending tubular members 140 and 142 set in advance of members 128 and 130, each of members 140 and 142 having aligned pin receiving apertures therethrough (See FIG. 2). A pair of spaced vertically opening sleeves 144 and 146 secure rectangular laterally opening sleeve 148 to members 140 and 142 by spring urged pins 150 extending through the apertures in members 140 and 142.

For reciprocating sleeve 148, each knob 154 is withdrawn against the action of spring 152 withdrawing pins 150 to permit sleeves 144 and 146 to slide on members 140 and 142. Telescoping members 156 extend from sleeve 148 and are locked by pins 158 extending through sleeve 148 and any of apertures 160 in members 156, therefore making the length of projection of members 156 adjustable with respect to rectangular sleeve 148.

Figure 4:
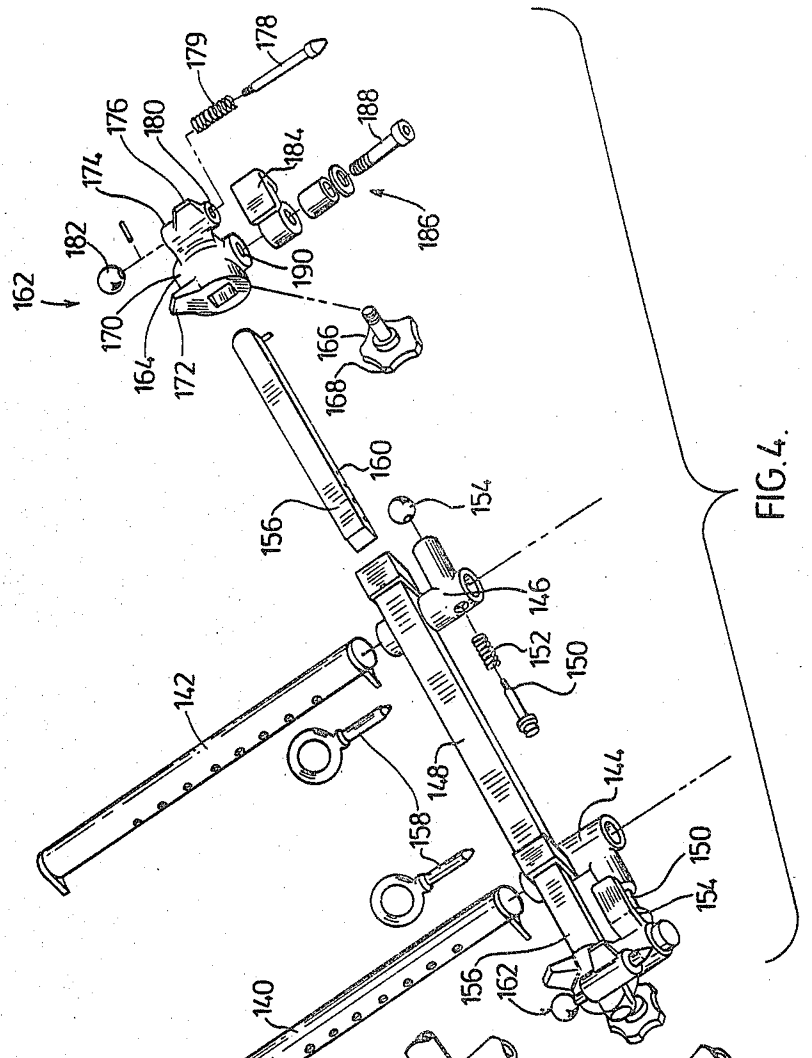
FIG. 4 is a partially exploded view of part of the carrier shown in FIG. 2.

Wheelchair securing assemblies 162 (See FIGS. 2,4, 5 and 6) each comprises sleeve 164 (seen best in FIG. 4) for securing to rectangular member 156 by threaded rod 166 having knob 168 tightened through a threaded aperture (not shown) through sleeve 164 against the back wall (not shown) of member 156 to lock sleeve 164 to member 156 until rod 166 is loosened. Sleeve 164 is bulbous having curved upper surface 170 and carried upstanding flange 172, and vertical sleeve 174 forwardly of sleeve 164 and on the end of sleeve 164 remote flange 172. Flange 176 extends away from sleeve 174 at 90° to the direction of sleeve 164. Pin 178 carrying spring 179 extends downwardly through opening 180 in sleeve 174 and is secured to knob 182 used to retract pin 178 upwardly into sleeve 174 against the action of spring 179 compressed against a ledge (not shown) in sleeve 174.

Each U-arm 184 is secured to the underside of bulbous sleeve 164 (to open towards the other assembly 162), by pin assembly 186 to pivot in a generally horizontal plane, on pin 188 secured in aperture 190. When pin 178 is retracted upwardly U-arm 184 is free to swing past sleeve 174. Otherwise it can swing no further than against pin 178.

In diverging curved area 184 two cross-members 186 and 188 join members 128 and 130. Plate 190 extends downwardly from cross-member 186 and in advance of member 188. Plate 192 extends downwardly from cross-members 188 and carries male plug 194 (See FIG. 7) for joining with female plug 86 and a pair of alignment apertures 196 aligned for receiving alignment pins 104 therethrough (See FIGS. 3 and 7).

Each of plates 190 and 192 are secured to longitudinally extending connectors 198 and 200 at either side of the plates and support a pair of axles 202 and 204 proximate either end extending through each of connectors 198 and 200. Four rollers 206 are journaled for rotation on the ends of axles 202 and 204, are of a diameter less than the opening of channel 90 and are spaced by a distance less than the distance between top opening 102 and the end of channel 90 at wall 98. Axles 202 and 204 space rollers 206 by a distance equal to the spacing of channels 90. Each of plates 190 and 192 are of a width less than the space between channels 90. Bar 203 (See FIG. 3) is secured between connectors 198 and 200 between axles 202 and 204 nearer axle 204. Switch 70 is electrically connected to male plug 194 and when plugs 86 and 194 are connected, switch 70 controls the operation of motor 60 and any movement of the carrier including any braking action on drive shaft 62 by the action of plate 76 and brake pads 66.

Handle assembly 32 is secured to base 30 for use as shown in FIG. 3. Rollers 206 secured below plate 190 are fed through opening 102 into channels 90 and pushed on lower wall 94 towards end connector member 98 until rollers 206 overly openings 102 at which time they are lowered to seat on bottom wall 94 of channel 90. Thereafter, handle assembly 32 is moved towards female plug 86. As axle 204 engages latches 108 and 110, it exerts a force against the sloped wall of each latch 108 and 110, depressing latches 108 and 110 permitting axle 204 to pass thereover. In the same way bar 203 passes latches 108 and 110 prior to male plug 194 engaging female plug 86. Therefore, bar 203 is longitudinally spaced from plug 194 by a distance less than the longitudinal distance between latches 108 and 110 and female plug 86. Tapered alignment pins 104 passing through apertures 196 in plate 192 guide male plug 194 to be connected to female plug 86. At that point, handle assembly 32 is angled at an angle of about 125° to runner 44.

For removing handle assembly 32, panel 118 of Z-plate 114 is depressed (see FIG. 3) depressing latches 108 and 110, permitting handle assembly 32 to be pushed past latches 108 and 110 and to be removed with rollers 206 on axle 202 to be withdrawn first through openings 102.

As can be seen, wheel supporting members 136 and 138 are positioned well above runner 44 when female and male plugs 86 and 194 have been connected.

Figure 6:
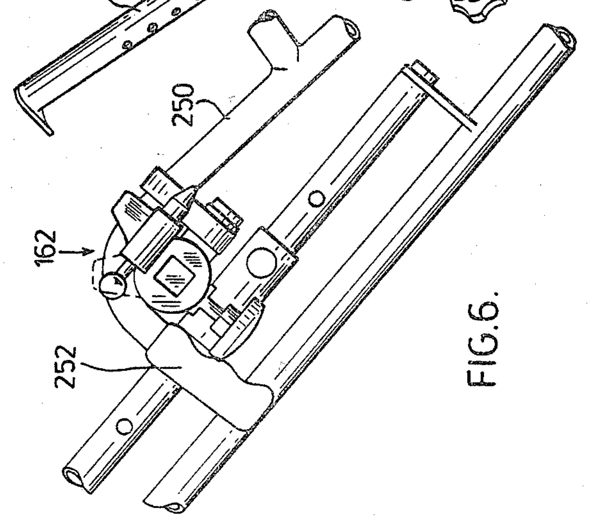
FIG. 6 (found with FIG. 4) is a side view of part of the structure shown in FIG. 5.
Figure 9:
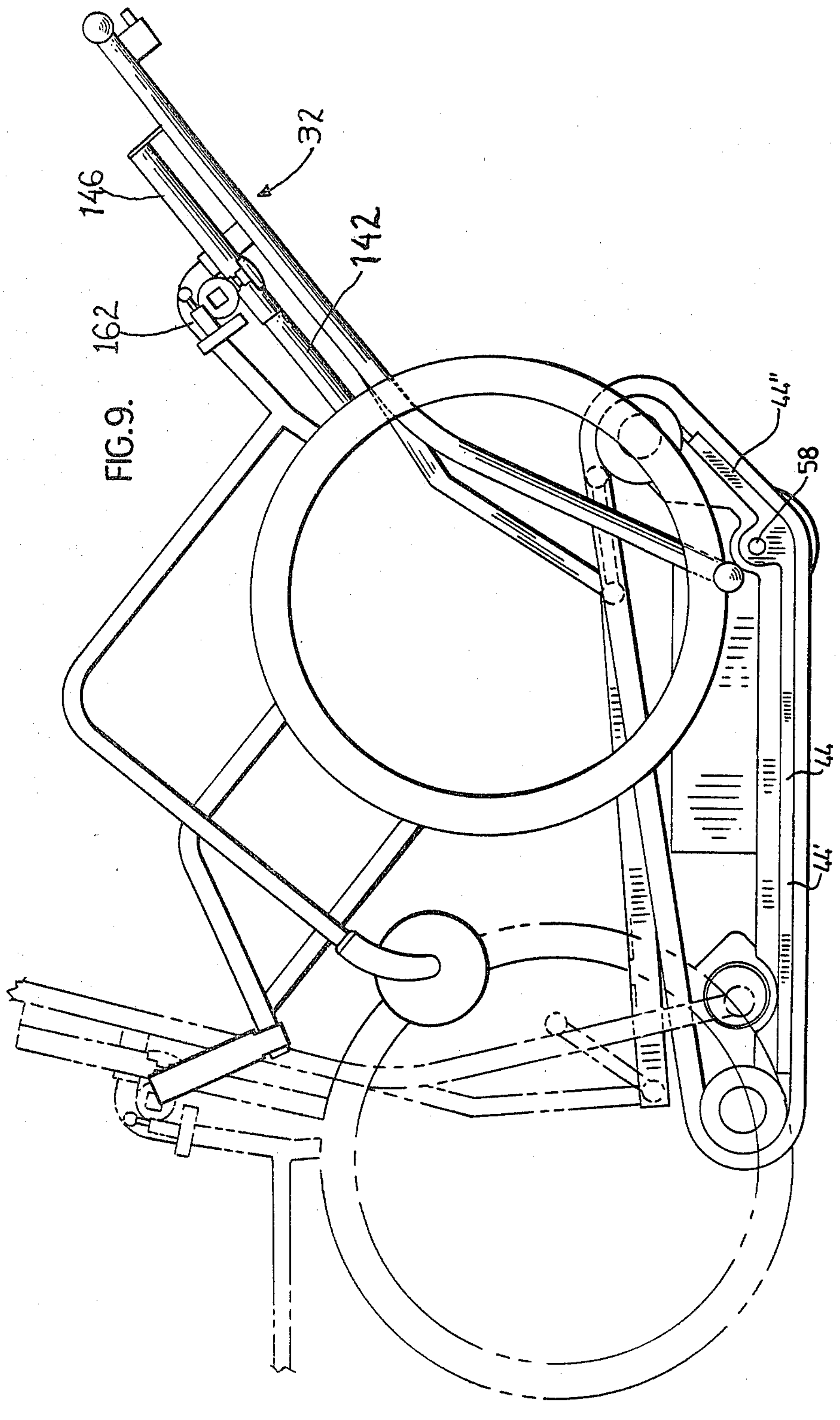
FIG. 9 illustrates schematically a method of mounting the wheelchair to the carrier.

Wheelchair 22 is secured to carrier 20 with handle assembly 32 proximate wall 98 and with only the pair of rollers 206 on axle 202 lodged in channels 90, as shown in FIG. 9. Wheelchair 22 is backed up so that the wheels are supported as shown by members 136 and 138 and upper frame members and top handles are secured by assembly 162 as shown in FIGS. 5 and 6. Particularly, each of vertically extending tubular members 250 (which extend on either side of the back of wheelchair 22) bent at their upper end to form horizontally rearwardly extending handles 252 (covered by grips 254) are each secured to assembly 162 with handle 252 overlying bulbous sleeve 164 on upper surface 170 to abut inner vertically extending flanges 172 and members 250 are gripped by U-arm 184 held in position by pin 178 and abutting flanges 176.

Handle assembly (plus wheelchair) is then pivoted with rollers 206 on axle 202 acting as the pivot point and rollers 206 on axle 204 are dropped through opening 102 onto channel bottom wall 94. Thereafter, the handle assembly is moved up the incline to its locked operational position (See FIG. 9) fully supporting wheelchair 22 on members 136 and 138 and assemblies 162.

Figure 10:
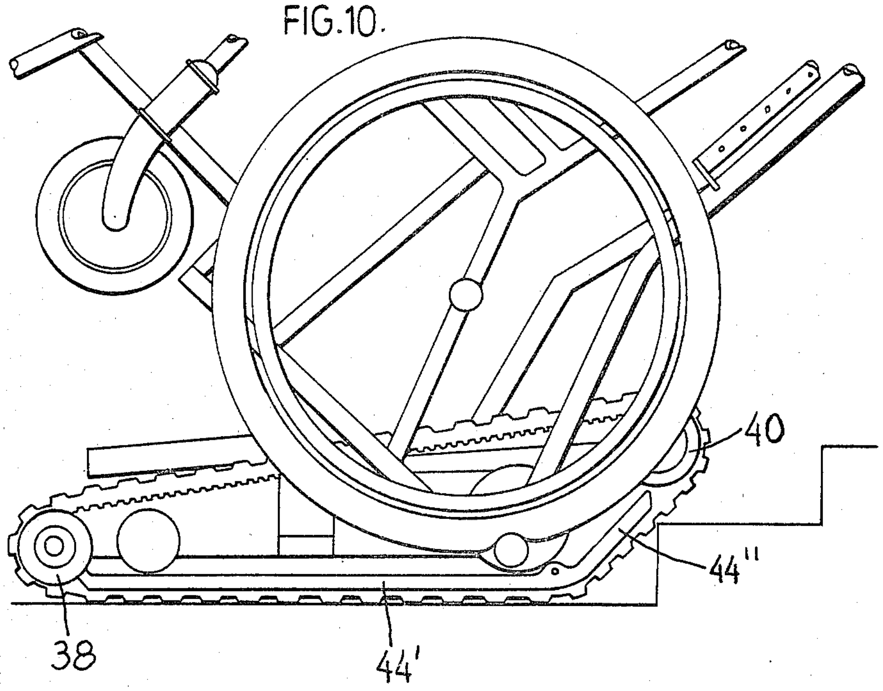
FIGS. 10 and 11 illustrate the method of use of the carrier when ascending a staircase.
Figure 11:
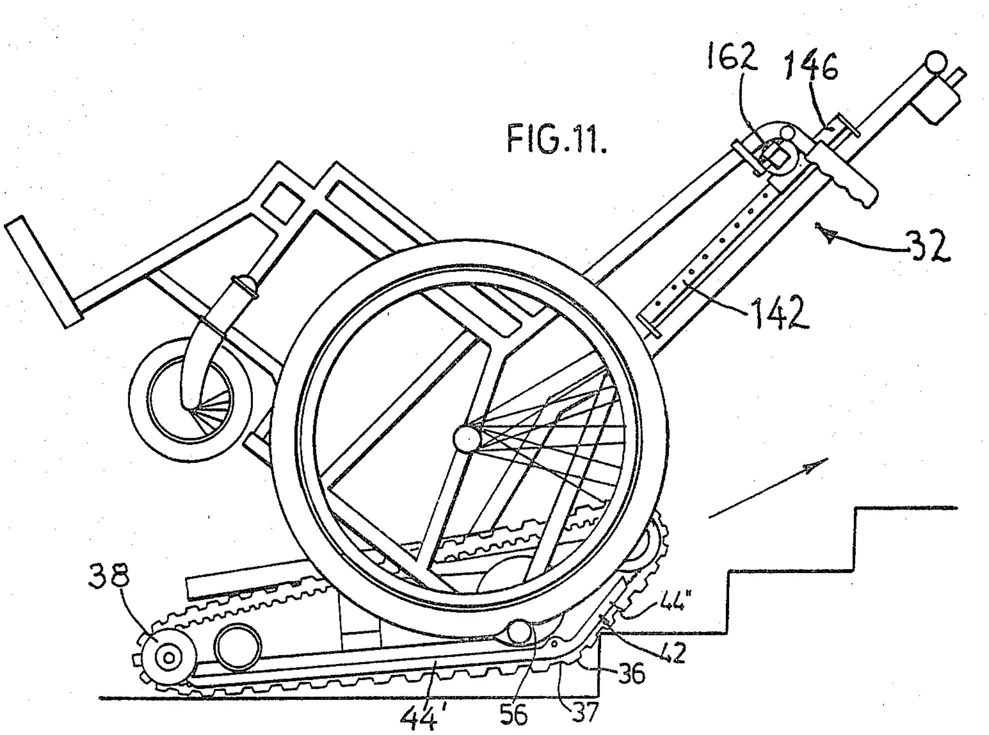

As is apparent from FIGS. 1, 10 and 11, the wheelchair at all times faces down the stairs when the carrier ascends or descends any staircase.

After switch 70 has been activated setting in motion tracks 31 and 34 in a clockwise direction about rollers 38 and 40 for causing the carrier to climb up the stairs, the track passing over the outer surface of the second portions $44^{11}$ of runners 44 engage the top edge of the bottom step, smoothly gripping it starting the carrier up the stairs. As the carrier climbs on the tracks under the second portion $44^{1}$ (See FIG. 10) the point of contact with the initial step reaches the curved portion between the first ($44^{1}$), and second ($44^{11}$), portions of runner 44 causing the carrier to change its angle of climb onto the track covering the outer surface of the first portion $44^{1}$ of runner 44. Thereafter, the carrier climbs up the steps on the track covering the first portion $44^{1}$ of runner 44. In this stage of climbing the carrier as in FIG. 1, causes the passenger to sit safely back in the wheelchair. If the electrical power should be cut at any time during the ascent, or switch 70 released thereby breaking the circuit, rollers 38 are precluded from rotating by any desire for downward movement by tracks 31 and 34 due to gravity because of the braking action of plate 76 on plate 64 and brake pads 66 and thus on drive shaft 62.

Switch 70 is a three position switch-left, right and center. To the left and right the switch closes the circuitry to drive the tracks 31 and 34 of the carrier 20 to ascend and descend staircase 26. In the center, switch 70 is in the off position opening the circuit. Switch 70 is constructed to return lever $70^{1}$ (See FIG. 2) to the off position whenever the lever is not held to the left or right by the action of springs (not shown).

With reference to FIG. 3, spot X marked on runner 44 marks the center of gravity of the carrier. When the carrier extends angularly over the last step with the X passed over the last step during the ascent, the carrier may be stopped and pivoted on the point of contact of the tracks with the top step to sit on the upper landing of the staircase and then moved further onto the landing. For the carrier to descend the staircase, the operational steps are reversed and appropriately modified for example, the point X—center of gravity—is positioned over the top stair of the staircase off the landing and the carrier pivoted on the point of contact.

As many changes could be made to the construction of the preferred embodiment of the invention without departing from the scope of the invention, it is intended that all material contained in the detailed description of the preferred embodiment be interpreted as illustrative of the invention and not in a limiting sense.

The embodiments of the invention in which an exclusive privilege or property is claimed are as follows:

1. A stair climbing wheelchair carrier comprising a handle assembly and base, the handle assembly adapted for securing the wheelchair to the carrier, means for securing the handle assembly to the base, the base comprising a pair of spaced endless tracks having climbing lugs on the outside surface thereof, each of the endless tracks entrained around a pair of rollers and passing under the outer surface of a runner, one of the rollers situate proximate one end of the runner, the other proximate the other end, the runner being bent intermediate its ends to form a first portion extending away from one of the rollers and a second portion extending away from the first portion towards the second roller at an angle of between about 125° and about 145° to the first portion, the length of track extending under the second portion and around the roller proximate the second portion being such as to extend over the usual bottom step of the staircase when the carrier is positioned proximate the bottom of the staircase, and the disposition of the first portion of the runner being such as to overlie the surface on which the wheelchair is used whereby the track engaging the surface or stair is fully supported.

2. The stair climbing wheelchair carrier of claim 1, wherein said angle is about 135°.

3. The stair climbing wheelchair carrier of claim 1, wherein drive means drives at least one roller of each pair of rollers and said at least one roller is provided with driving lugs and recesses on the outer surface and the tracks have corresponding recesses and lugs on the inner surface for engaging the lugs and recesses of the roller.

4. The stair climbing wheelchair carrier of claim 1 or 3, wherein the roller proximate the end of the second portion is positioned considerably above the roller proximate the end of the first portion to provide a sloped track portion therebetween.

5. The stair climbing wheelchair carrier of claim 1, wherein the handle assembly is angled at about 125° to the first portion of the runner.

6. The stair climbing wheelchair carrier of claim 1, wherein electrical drive means are provided in the base for driving at least one of the rollers for driving the endless tracks, said drive means including a battery for operating the drive means, an electrical motor driven by the battery and means to preclude movement of the track when the motor is electrically deactivated.

7. The stair climbing wheelchair carrier of claim 6, wherein a drive shaft extends from the motor for driving the at least one roller of the rollers, and said means to preclude movement of the track when the motor is electrically deactivated comprises brake pads applied to preclude rotation of the drive shaft.

8. The stair climbing wheelchair carrier of claim 6, wherein a drive shaft extends from the motor for driving at least one of the rollers, and said means to preclude movement of the track when the motor is electrically deactivated comprises a fixed electromagnet surrounding the drive shaft, an annular spring surrounding the drive shaft between the drive shaft and electromagnet, a non-rotatable iron plate secured to the spring on the side of the spring remote the motor, the iron metal plate to be normally spaced from the electromagnet under the action of the spring, a second plate secured to the drive shaft to rotate therewith, brake pads between the first and second plates and engaging both plates when the iron plate is spaced from the magnet thereby precluding rotation of the drive shaft, but engaging only one of the plates when the electromagnet is activated pulling the iron plate against the action of the spring towards the electromagnet thereby permitting the drive shaft to rotate.

9. The stair climbing wheelchair carrier of claim 6, wherein electrical circuit connecting means connects the drive means to controls for controlling the operation of the drive means, means on the base connects the handle assembly to the base, and the handle assembly comprises complimentary means for connecting to the means on the base for connecting the handle assembly to the base, controls for controlling the operation of the drive means, and electrical circuit connecting means connected to the controls for connecting to the electrical circuit connecting means on the base for connecting the drive means to the controls.

10. The stair climbing wheelchair carrier of claim 9, wherein the means on the base to connect the handle assembly to the base comprises a pair of inwardly opening channels terminating at one end proximate the roller proximate the end of the first portion of the runner, the channels having an entry opening through the top of each channel spaced from the end of the channel which terminates proximate the roller proximate the end of the first portion of the runner, the channels disposed along the top of the base at substantially the same angle to the ground as the upper part of the track extending between the rollers and the electrical circuit connecting means on the base comprises an electrical plug situate proximate the end of the channels remote the ends with the openings, electrically connected to the battery and drive means, and the handle assembly comprises a roller assembly proximate the bottom thereof, the roller assembly comprising laterally spaced pairs of longitudinally spaced rollers for sliding in the channels after having been fed into the channels through the openings, each roller being of a diameter smaller than the openings in the top of the channels, the lateral spacing between the pair of rollers being substantially equal to the lateral spacing between the channels and the electrical connecting means electrically connected to the controls comprises a complimentary electrical plug for securing with the electrical plug connection in the base when the rollers are positioned in the channels and moved in the channel to connect the plugs.

11. The wheelchair carrier of claim 10, wherein each opening is spaced from the end of each channel by a distance substantially equal to the longitudinal spacing of the rollers of each pair of rollers.

12. The wheelchair carrier of claim 10 or 11, wherein safety locking means are provided for locking the handle assembly to the base, the locking means comprising a latch mechanism comprising normally upwardly spring urged latch teeth extending upwardly from the base and retractable into the base upon compressing the spring normally urging the teeth upwardly and a pair of laterally extending members secured proximate the bottom of the roller assembly, to the roller assembly, each of the members being engageable by the latch teeth when the latch teeth normally extend upwardly and not being so engagable by the teeth when the teeth are retracted and means for retracting the latch teeth, the latch teeth being sloped on their sides remote the plug secured in the base in a direction from their top, away from the plug in the base but being maintained substantially vertically on the other side, and means to retract the latch teeth.

13. The wheelchair carrier of claim 9, 10 or 11, wherein the control means on the handle assembly comprises a switch spring urged normally to an off position and being pivoted or movable against the action of the spring to an "on" position when moved in either direction against the action of the spring to cause the tracks to rotate in one direction about the rollers when the switch is moved in one direction and the tracks to rotate in the other direction when the switch is moved in the other direction.

14. The stair climbing wheelchair carrier of claim 9, further comprising securing means for securing the wheelchair to the carrier, said securing means comprising wheel supports on which the wheels of the wheelchair may rest and vertically adjustable arms and support means carried by the handle assembly for carrying and locking the upper part of the wheel chair to the handle assembly.

15. The stair climbing wheelchair carrier of claim 14, wherein said vertically adjustable arms and support means on the handle assembly comprises a pair of vertically adjustable sleeves supporting a laterally extending sleeve opening laterally at either end and having laterally telescoping members extending therefrom, the laterally telescoping members having adjustable support means slidable on the telescoping members for locking any size wheelchair to the carrier.

16. The stair climbing wheelchair carrier of claim 15, wherein said latter support means comprises surfaces on which the handles on the top of a wheelchair, will rest and a pivotable lockable arm for grasping vertical frame members of the wheelchair and locking them to the handle assembly.

17. A stair climbing wheelchair carrier comprising a top assembly and base, the top assembly adopted for securing the wheelchair to the carrier, means for securing the top assembly to the base, the base comprising a pair of spaced endless tracks having climbing lugs on the outside surface thereof, each of the endless tracks entrained around a pair of rollers and passing under the outer surface of a runner, one of the rollers situate proximate one end of the runner, the other proximate the other end, the runner being bent intermediate its ends to form a first portion extending away from one of the rollers and a second portion extending away from the first portion towards the second roller at an angle of between about 125° and about 145° to the first portion, the length of track extending under the second portion and around the roller proximate the second portion being such as to extend over the usual bottom step of a staircase when the carrier is positioned proximate the bottom of the staircase, and the disposition of the first portion of the runner being such as to overlie the surface on which the wheelchair carrier is used whereby the track engaging the surface or stair is fully supported.

18. The stair climbing wheelchair carrier of claim 17, wherein said angle is about 135°.

19. The stair climbing wheelchair carrier of claim 17, wherein drive means drives at least one roller of each pair of rollers and said at least one roller is provided with driving lugs and recesses on the outer surface and the tracks have corresponding recesses and lugs on the inner surface for engaging the lugs and recesses of the roller.

20. The stair climbing wheelchair carrier of claim 17 or 19, wherein the roller proximate the end of the second portion is positioned considerably above the roller proximate the end of the first portion to provide a sloped track portion therebetween.

21. The stair climbing wheelchair carrier of claim 17, wherein electrical drive means are provided in the base for driving at least one of the rollers for driving the endless tracks, said drive means including a battery for operating the drive means, an electrical motor driven by the battery and means to preclude movement of the track when the motor is electrically deactivated.

22. The stair climbing wheelchair carrier of claim 21, wherein a drive shaft extends from the motor for driving the at least one roller of the rollers, and said means to preclude movement of the track when the motor is electrically deactivated comprises brake pads applied to preclude rotation of the drive shaft.

23. The stair climbing wheelchair carrier of claim 21, wherein a drive shaft extends from the motor for driving at least one of the rollers, and said means to preclude movement of the track when the motor is electrically deactivated comprises a fixed electromagnet surrounding the drive shaft, an annular spring surrounding the drive shaft between the drive shaft and electromagnet, a non-rotatable iron plate secured to the spring on the side of the spring remote the motor, the iron metal plate to be normally spaced from the electromagnet under the action of the spring, a second plate secured to the drive shaft to rotate therewith, brake pads between the first and second plates and engaging both plates when the iron plate is spaced from the magnet thereby precluding rotation of the drive shaft, but engaging only one of the plates when the electromagnet is activated pulling the iron plate against the action of the spring towards the electromagnet thereby permitting the drive shaft to rotate.

* * * * *